United States Patent
Ikeda et al.

(10) Patent No.: US 9,602,710 B2
(45) Date of Patent: Mar. 21, 2017

(54) AUTOMATED PARAMETER OPTIMIZATION FOR AN IMAGE SHOOTING SYSTEM

(71) Applicants: Hiroki Ikeda, Tokyo (JP); Atsuki Ishida, Tokyo (JP); Noriaki Misawa, Tokyo (JP); Hiroshi Oizumi, Tokyo (JP)

(72) Inventors: Hiroki Ikeda, Tokyo (JP); Atsuki Ishida, Tokyo (JP); Noriaki Misawa, Tokyo (JP); Hiroshi Oizumi, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 0 days.

(21) Appl. No.: 14/399,755

(22) PCT Filed: May 14, 2013

(86) PCT No.: PCT/JP2013/063405
§ 371 (c)(1),
(2) Date: Apr. 10, 2015

(87) PCT Pub. No.: WO2013/172335
PCT Pub. Date: Nov. 21, 2013

(65) Prior Publication Data
US 2015/0229826 A1 Aug. 13, 2015

(30) Foreign Application Priority Data
May 14, 2012 (JP) ................... 2012-111015

(51) Int. Cl.
*H04N 5/232* (2006.01)
*G03B 7/00* (2014.01)
*H04N 1/21* (2006.01)

(52) U.S. Cl.
CPC .......... *H04N 5/23206* (2013.01); *G03B 7/00* (2013.01); *H04N 1/2112* (2013.01); *G03B 2206/00* (2013.01)

(58) Field of Classification Search
CPC ................................................ H04N 5/23206
(Continued)

(56) References Cited

U.S. PATENT DOCUMENTS

| | | | |
|---|---|---|---|
| 2011/0001843 A1 | 1/2011 | Koishi | |
| 2011/0216223 A1* | 9/2011 | Nakamura | H04N 5/335 348/231.99 |
| 2011/0236005 A1* | 9/2011 | Teshima | H04N 5/23206 396/49 |

FOREIGN PATENT DOCUMENTS

| | | |
|---|---|---|
| JP | 2001-333360 | 11/2001 |
| JP | 2002-185938 A | 6/2002 |

(Continued)

OTHER PUBLICATIONS

International Search Report and Written Opinion with English translation received in Patent Cooperation Treaty for Application No. PCT/JP2013/063405 dated Jun. 25, 2013, 13 pages.
European Patent Office, Extended European Search Report for EP Application No. 13791613.6 dated Oct. 15, 2015, 7 pages.

*Primary Examiner* — Usman Khan
(74) *Attorney, Agent, or Firm* — Haynes and Boone, LLP

(57) ABSTRACT

An image shooting system capable of generating high-quality and high-definition images is provided through a camera even when a user of the camera has no knowledge on the camera's settings or photo-shooting techniques, or when the performance of the camera itself is low. There is provided an image shooting system having an image shooting apparatus and a server connected to the image shooting apparatus through the Internet, wherein the image shooting apparatus comprises: a unit for recording image shooting condition parameters as meta-information in a file of an image taken; a communication interface for connecting to the image shooting apparatus to the server, sending the image file to the server, receiving from the server and storing, optimal image shooting condition parameters for optimizing an image quality of the image file; and a unit for reading the optimal image shooting condition parameters received from the server and setting them as an image shooting condition for the image shooting apparatus based (Continued)

on user selections, wherein the server comprises: a unit for obtaining a image file from the image shooting apparatus; a unit for reading settings described in meta-information and determining a model of the apparatus; and an optimal image shooting condition parameter calculation unit for analyzing the image quality of the image file based on a predetermined algorithm as well as calculating, based on the determined model, the optimal image shooting condition parameters for the model to take the image.

8 Claims, 6 Drawing Sheets

(58) Field of Classification Search
USPC .................................................... 348/211.3
See application file for complete search history.

(56) References Cited

FOREIGN PATENT DOCUMENTS

| | | |
|---|---|---|
| JP | 2002-325189 | 11/2002 |
| JP | 2004-048699 | 2/2004 |
| JP | 2004-112487 | 4/2004 |
| JP | 2005-184610 | 7/2005 |
| JP | 2005-328576 A | 11/2005 |
| JP | 2008-017186 A | 1/2008 |
| JP | 2009-055088 A | 3/2009 |
| JP | 2010-087617 A | 4/2010 |
| JP | 2011-034237 | 2/2011 |
| JP | 2011-103548 A | 5/2011 |
| JP | 2011-199702 A | 10/2011 |

* cited by examiner

AUTOMATED PARAMETER OPTIMIZATION FOR AN IMAGE SHOOTING SYSTEM

CROSS REFERENCE TO RELATED APPLICATIONS

This application is a U.S. national phase of Patent Corporation Treaty Application No. PCT/JP2013/063402 filed May 14, 2013, which claims priority to Japanese Patent Application No. 2012-111015 filed May 14, 2012, the disclosure of the aforesaid applications is incorporated herein by reference.

FIELD OF THE INVENTION

The present invention relates to an image shooting system, and particularly, a system comprising a portable image shooting apparatus such as a digital camera or a digital video camera, and a server connected with the image shooting apparatus via the Internet.

BACKGROUND OF THE INVENTION

In recent years, performance of image shooting apparatuses such as digital cameras, video cameras and the like has been increasingly improved, and now even widely-used image shooting apparatuses can take high-quality images and videos. For example, even compact digital cameras can take high-definition images with resolutions comparable to those of single-lens reflex cameras from a decade ago, and some models enable detail settings including an exposure, an aperture, a white balance manually as well as having an automatic photographing mode.

However, in order to take high-quality images by appropriately utilizing the capabilities of these image shooting apparatus, users need knowledge on the capabilities accordingly, whereas users without the knowledge may not be able to take full advantage of their cameras' capabilities. High-end single-lens reflex cameras may allow their users to enjoy very different image results by changing settings through difficult operations, but compact cameras are required to produce images comparable to ones possible with the single-lens reflex cameras through easy operations.

On the other hand, non-stand-alone digital cameras such as ones included in cell phones do not offer very high resolutions or a high degree of setting freedom, and their image qualities are limited accordingly. Still, their users desire to produce images comparable to ones from stand-alone cameras.

As previously explained, extensive knowledge and techniques on camera settings are required in order to take high-quality images using high-performance cameras, whereas many users desire to take high-quality images even when using low-performance cameras such as portable ones with only limited settings.

Considering the above situation, the purpose of the present invention is to provide an image shooting system capable of generating high-quality and high-definition images through a camera even when a user of the camera has no knowledge on the camera's settings or photo-shooting techniques, or when the performance of the camera itself is low.

SUMMARY OF THE INVENTION

In order to achieve the above object, according to a principal aspect of the present invention, there is provided an image shooting system having an image shooting apparatus and a server which connects to the image shooting apparatus through the Internet, wherein the image shooting apparatus comprises: a unit for recording a model of the apparatus and image shooting condition parameters including an exposure, a shutter speed and/or a white balance, as meta-information in a file of an image taken; a communication interface for connecting to the image shooting apparatus to the server, sending the image file to the server, receiving from the server, optimal image shooting condition parameters for optimizing an image quality of the image file and storing the optimal image shooting condition parameters; and a unit for retrieving, according to a selection by a user, the optimal image shooting condition parameters received from the server and setting them as an image shooting condition for the image shooting apparatus, wherein the server comprises: a unit for obtaining the image file from the image shooting apparatus via the communication interface; a unit for reading the meta-information of the image file and determining a model of the image shooting apparatus; an optimal image shooting condition parameter calculation unit for analyzing the image quality of the image file based on a predetermined algorithm as well as calculating, based on the determined model, the optimal image shooting condition parameters for the model for taking the image; and a unit for sending the optimal image shooting condition parameters to the image shooting apparatus.

According to such a structure, an image file and its meta-information obtained with an image shooting apparatus such as a digital still camera, a digital video camera or the like may be sent to the cloud server on the Internet to thereby calculate the image's optimal image shooting condition parameters on the cloud server. Then, based on the optimal image shooting condition parameters obtained as above, so called the "cloud server" may remotely and "dynamically" set the image shooting condition for the image shooting apparatus to thereby enable the user to easily take high-quality images even when the user has limited knowledge and technique and when the apparatus itself has limited performance and degree of setting freedom.

According to one embodiment of the present invention, the server stores types and values of settable image shooting condition parameters for each model, based on which the image shooting condition parameter calculation unit calculates the optimal image shooting condition parameters for the model for taking the image, for which image quality has been analyzed.

According to such a structure, optimal image shooting condition parameters may be calculated for each model based on different types and values of settable image shooting condition parameters.

According to another embodiment, there is provided a system, wherein the meta-information, described by the image shooting apparatus as the image shooting condition parameters, includes location information of the image shooting apparatus, and the optimal image shooting condition parameter calculation unit of the server calculates the optimal image shooting condition parameters for the model for taking the image based on the location information.

According to such a structure, the optimal image shooting condition parameters may be calculated based on external information obtained and identified with the location information, for example, a local weather, an indoor situation of a gym or stadium, etc. In this case, it is preferable to have a database for storing external conditions.

According to yet another embodiment, there is provided a system, wherein the meta-information, described by the image shooting apparatus as the image shooting condition parameters, includes environmental information such as air temperature and the like detected by a sensor of the image shooting apparatus, and the optimal image shooting condition parameter calculation unit of the server calculates the optimal image shooting condition parameters for the model for taking the image based on the environmental information.

According to such a structure, optimal image shooting condition parameters may be calculated at the server based on the information detected by the sensor of the image shooting apparatus. Thus, image shooting condition parameters varying depending on the apparatus type are preferably stored in a database.

According to still another embodiment, the communication interface is an SD card with an on-board communication function.

According to such a structure, the communication function may be implemented on the SD card itself, thus making it unnecessary to provide the image shooting apparatus with a communication function.

According to yet another embodiment, there is provided a system, wherein the server comprises: an image quality adjustment unit for adjusting the image quality of the image file obtained from the image shooting apparatus; and an image file transmission section for sending the image file to the image shooting apparatus after the image adjustment.

According to such a structure, the server, instead of the image shooting apparatus, may perform the image adjustment, write and return the adjusted image file to the image shooting apparatus.

It is to be noted that other characteristics and marked effects of the present invention will be appreciated to those skilled in the art upon referring to the following detailed description of the preferred embodiments and the accompanying drawings.

DETAILED DESCRIPTION OF THE INVENTION

One embodiment of the present invention will be described below in accordance with accompanying drawings.
(Overall Structure)

Figure 1:
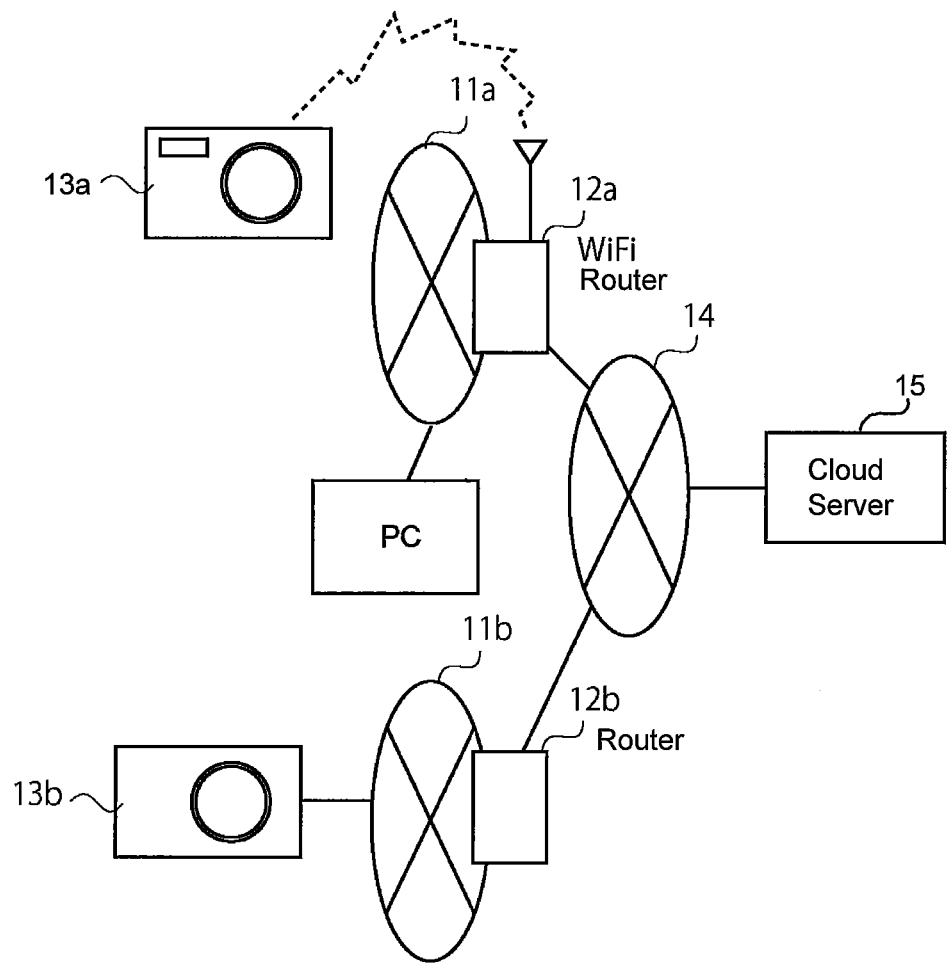
FIG. 1 is an overall structural diagram view showing one embodiment of the present invention.

FIG. 1 is a schematic structural view showing an overall structure of the present invention.

In this figure, 11a and 11b are local networks (LAN's) for communicating with IPv4 or IPv6. One of these local networks, 11a, is configured by a wireless router 12a (Wi-Fi router), and these local networks 11a and 11b are adapted to connect with digital cameras (image shooting apparatuses of the present invention) with or without a wireless communication function, as indicated with 13a and 13b.

These local networks 11a and 11b are connected to the Internet network 14 via the wireless router 12a or a wireless router 12b, and a communication carrier/ISP (not shown). This Internet network 14 is adapted to use IPv4 for communication. Connected to this Internet network 14 is connected to a cloud server 15 (a server of the present invention) for receiving image files from the digital cameras and adjusting an image quality.

The above digital camera 13 and cloud server 15 are now described in detail.
(Digital Camera Structure)

Figure 2:
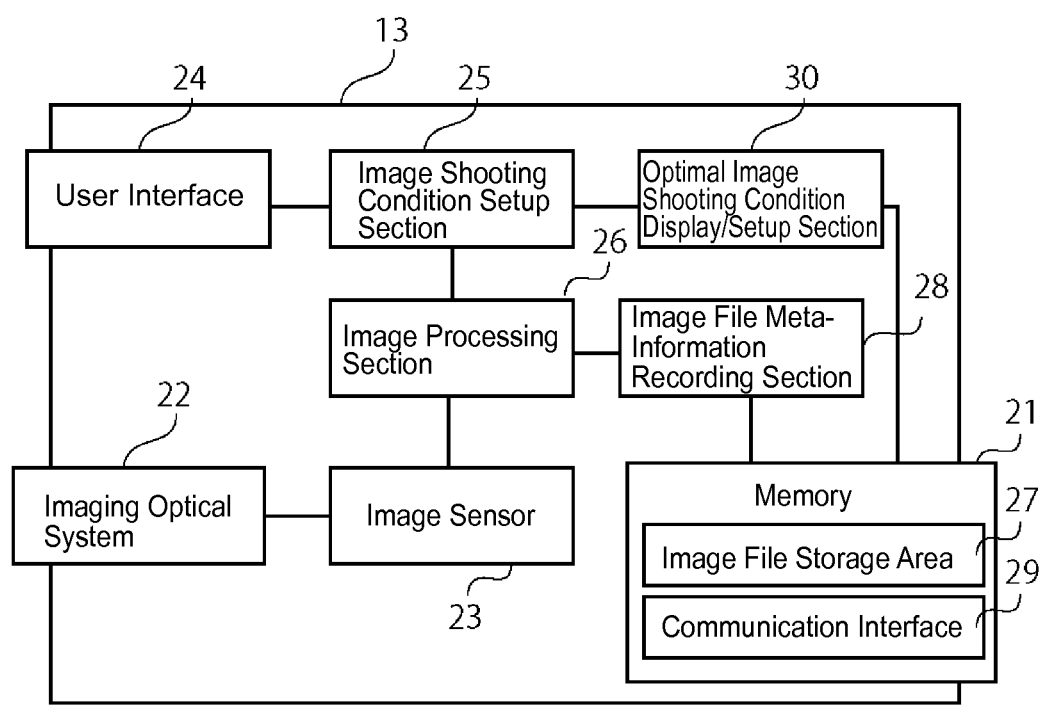
FIG. 2 is a diagram showing a structure of the one embodiment of the present invention.

As shown in FIG. 2, first the digital cameras 13 comprises:
a memory card 21 as a storage medium;
an imaging optical system 22 equipped with a lens;
an image sensor 23 for detecting an object though the imaging optical system 22, converting the detection result into image data as electric signals and outputting the image data;
an image shooting condition setup section 25 for receiving, via a user interface 24, and setting image shooting condition parameters such as an exposure, a shutter speed, a white balance and the like;
an image processing section 26 for processing imaging data from the image sensor 23 according to the image shooting condition parameters; and
an image file meta-information recording section 28 for describing as meta-information, image shooting condition parameters including the exposure, the shutter speed, the white balance, an aperture, ISO sensitivity, whether of not to use a flash correction, CMOS (image sensor) information, lens information, location information, temperature information and the like in the image data processed by the image processing section 26 (and/or directly in the imaging data from the image sensor 23) according to a model of the camera; and writing the image shooting condition parameters into an image file storage area 27 of the memory card.

These components 21-28 may be configured as in typical digital cameras 13. Also, an image shooting condition and image-processable items may vary depending on the camera model. For example, configurable conditions and image processing capabilities are different between high-end and cell phones. Further, the digital camera 13 may be configured to directly record the unprocessed imaging data detected by the image sensor 23, record only the image data after it is processed by the image processing section 26, or record both the unprocessed imaging data and the processed image data. Additionally, this camera 13 preferably comprises an environment sensor such as a temperature sensor or a location sensor depending on the model in order to obtain the meta-information.

The digital camera 13 according to the one embodiment of the present invention comprises the following structure in addition to the typical structure described above.

First, the digital camera 13 is provided with a communication interface 29 for establishing a tunneling connection between this digital camera 13 and the cloud server 15. In this embodiment, this communication interface 29 is installed in the memory card 21, and is adapted to enable TCP/IP communication via the tunneling connection with the cloud server 15 independently of the digital camera body.

This communication interface 29 has functions for sending the image file to the cloud server 15 as well as receiving the image file after its image quality is adjusted on the cloud server 15 and writing the received image file back to the image file storage area 27 of the memory card 21 as discussed below. Here, the post-adjustment image file may be stored with a different name from its original file name, or may be stored with the same original name over the original file.

Further, this digital camera 13 is provided with a post-adjustment image shooting condition display/setup section 30 for reading the image shooting condition parameters described in the image file's meta-information, displaying the image shooting condition parameters on the user interface 24, and setting the parameters as the image shooting condition for the image shooting apparatus based on the user selection when the post-adjustment image file is received from the cloud server 15.

For example, upon receipt of the image file from the cloud server 15, this post-adjustment image shooting condition display/setup section 30 may be configured to display the receipt on the user interface 24 realtime, and allow the user to set the post-adjustment optimal image shooting condition parameters as the current image shooting condition, or may be configured to display the modified image data stored in the memory card 21 based on the user selection, and allow the image shooting condition setting of the user's choice to be retrieved and set on the digital camera 13.

As discussed below, if the image file size is large such as when it is a video image, or if the image quality adjustment at the cloud server 15 or re-writing to the digital camera 13 is unnecessary, it is noted that the communication interface 29 and the post-adjustment image shooting condition display/setup section 30 is preferably configured to receive only the optimal image shooting condition parameters from the cloud server 15, and display and/or set the optimal parameters.

(Memory Card Structure)

Next, the structure of the memory card will be discussed in detail below with reference to FIG. 3 and later.

The memory card 21 is a SD card and comprises an enclosure 31, installed within which are a Wi-Fi communication module 32 for communicating with the wireless router 12; an application program 33 as a file server program (FIG. 4); an operating system (OS) 34 for this application program 33 (FIG. 4); and a relay communication module 35 for establishing the tunneling connection with the cloud server 15 (FIG. 4), wherein when inserted in the digital camera 13, the memory card 21 is configured to function as one apparatus on the local network 11a independently of the digital camera 13.

Figure 3:
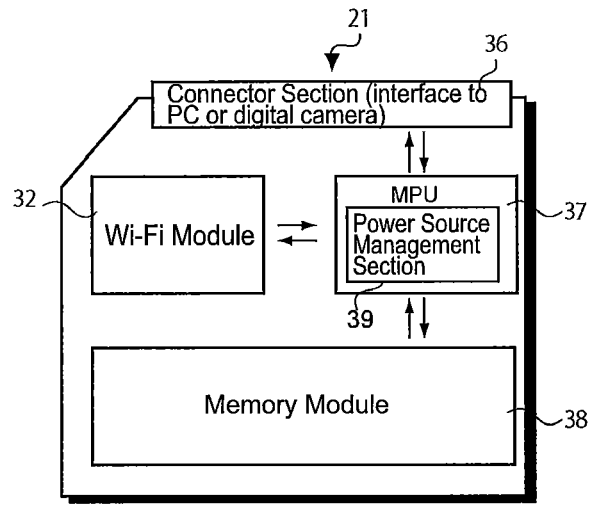
FIG. 3 is a schematic structural view showing a memory module in a memory card device of the one embodiment of the present invention.
Figure 4:
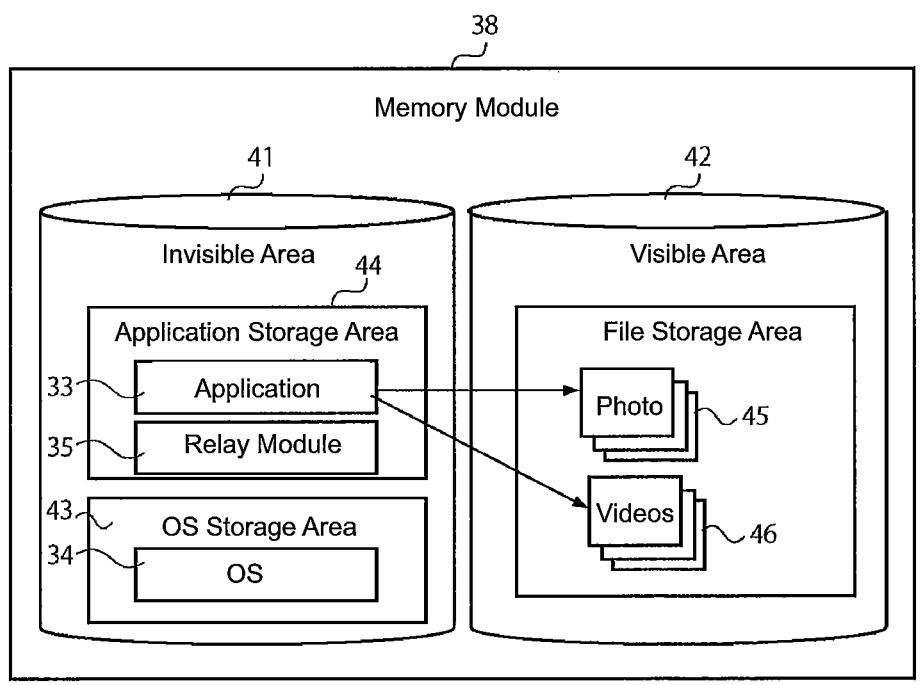
FIG. 4 is a schematic view showing a logical processing system in the memory card device of the one embodiment of the present invention.

As shown in FIG. 3, this memory card 21 is physically structured and equipped with a communication/powering interface 36, which is a connection interface with the digital camera 13; the Wi-Fi communication module 32 for connecting with the wireless router 12a; an MPU 37 (arithmetic and logic unit) implemented with a work memory, various central processing units and various controllers on one chip; and a memory module 38 with, for example, about 8G-32G capacity. These components are interconnected via communication buses. Also, as shown in FIG. 4, the memory module 38 is configured by being logically divided into an invisible area 41 (an area used by the system), which cannot be recognized by the digital camera 13 and is dedicated to a system use, and a visible area 42 (an area used by the user), which can be recognized and used by the digital camera 13.

The invisible area 41 is provided with an OS (operation system) storage area 43 for storing the OS 34; and an application storage area 44 for storing the relay communication module 35 as a communication module of the present invention, and the application program 33 (the server program).

Also, the visible area 42 is adapted to store files processed by the digital camera 13, such as photographs 45 and video files 46.

Here, at least this memory card 21 and the cloud server 15 are intended to be provided or fabricated by the same manufacturer or under unified standards, and are designed to interface with each other. As described below, the cloud server 15 provides the relay communication module 35 with a virtual private address/global address with IPv4 for the application program 33 to thereby enable communication using a TCP/IP session with tunneling connection established on the cloud server 15 regardless of its ISP and carrier.

(Establishing Tunneling Connection)

Next, the tunneling connection to the cloud server 15 by the memory card 21 will be discussed below.

Figure 5:
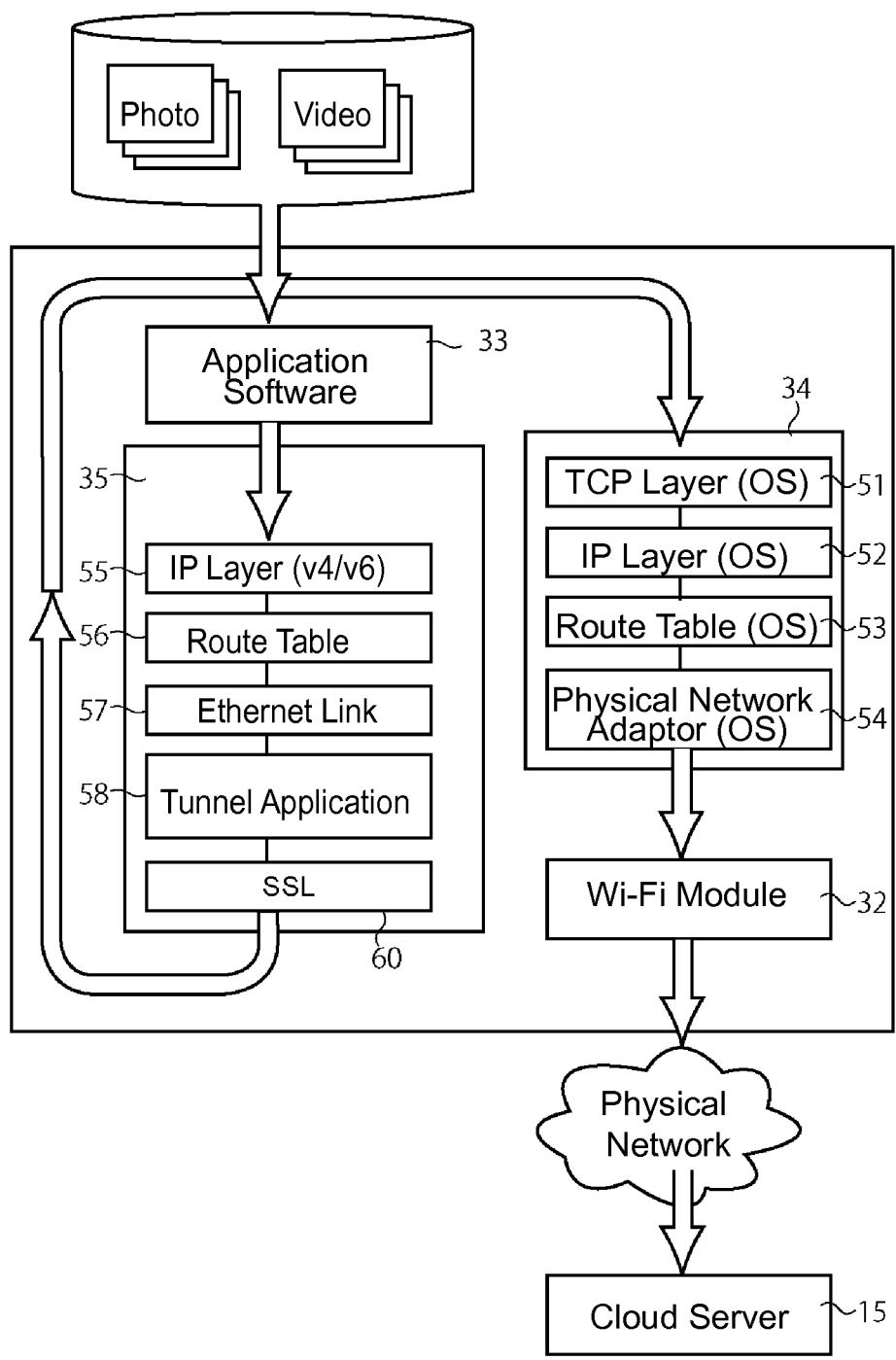
FIG. 5 is a schematic view showing a logical communication processing system between the memory card and a cloud server of the one embodiment of the present invention.

FIG. 5 is a functional block diagram showing the OS 34, the relay communication module 35, the application 33 and the Wi-Fi module 32, which are installed in the memory card device 21. In the present discussion, it is to be noted that only the structures related to features of the present invention are depicted and explained, and depiction and descriptions on other structures expected to be included are omitted.

In FIG. 5, the OS 34 portion shows a local communication protocol stack group included in a kernel, in which OS 34 a physical network adaptor (layers 1, 2) 54 for controlling a network card, a route table 53, an IP layer (layer 3) 52 and a TCP layer (layer 4) 51 are configured hierarchically.

On the other hand, the relay communication module 35 is provided with a protocol stack of a layer (v4/v6) 55, a route table 56 and an Ethernet link 57, each of which is in compliance with RFC and independent of the OS 34, to thereby allow creation of the application program 33 independent of any particular network environment. This relay communication module 35 further has a tunneling application 58. As discussed in detail below, this tunneling application 58 has functions to process packets received from the Ethernet® link layer 57 to prevent congestion due to the TCP-Over-TCP problem and a reduction in communication band, and send the packets to the cloud server 15 with the tunneling connection. Although an SSL 60 is shown in the figure, this structure may not have the SSL 60.

The above group of software constituting the relay communication module 35 is provided as a library, and is adapted to be read by the application program 33 as needed and utilized as a communication interface of this application program 33. Thus provided as a library, the relay communication module 35 allows to minimize alteration of the respective application program 33.

Next, operations of this communication module 35 will be described below.

The memory card 21 is configured to launch the OS 34 when the digital camera 13 is turned on with the memory card 21 inserted therein and if the memory card 21 is electrically powered. The OS 34 is deployed on a memory in the MPU 37 (FIG. 3) and launched on a RAMDISK. When the RAMDISK is built by this launching process, the library needed by the OS 34 is deployed on the RAMDISK and a launch sequence of the application 33 starts.

In the meantime, the Wi-Fi module 32 is also activated and, if the memory card device 21 is within a wireless network area, the Wi-Fi module 32 is automatically connected with the wireless router 12a, and obtains an IP address of the local network 11a.

When the application program 33 launches, the relay communication module 35 is read into the memory of the MPU 37 according to an instruction from the application program 33. Then, the application program 33 of the relay communication module 35 first connects with a particular tunnel broker on the Internet through the Wi-Fi module 32 and the router. This tunnel broker selects an cloud server 15 as a tunnel connection destination from an address database, not shown (in other words, the application program 33 retains the web address of the broker or the cloud server 15), and notifies the relay communication module 35 of an IPv4 address of this cloud server 15. Thus, the relay communication module 35 may identify the cloud server 15, and after user authentication, may establish the tunneling session and communicate using a MAC address and an IP address for the application received from the cloud server 15.

In other words, once the application program 33 is launched and the relay communication module 35 connects with the cloud server 15, the authentication is performed to establish the connection and the cloud server 15 provides the relay communication module 35 with the MAC and IP addresses assigned for a virtual private network for the application program 33 (these MAC and IP addresses may alternatively be assigned by the tunnel broker, or configured and stored in the memory card 21 as its factory default). The relay communication module 35 retains these MAC and IP addresses as data in the memory of the MPU 37.

In other words, according to the present embodiment, the memory card 21 may be directly connect to a virtual network via a cloud server 15 on the Internet.

According to such a structure where the protocol stack of the layers 2, 3 and 4 is retained independently of the local communication protocol stack (51-54) of the OS 34, communication is enabled without having to depend on any particular network environment determined by the digital device, the OS 34 and the like. In other words, even on an OS without a particular protocol stack installed, application software using that particular protocol may be executed. For example, even in an OS environment without the IPv6 protocol, application software using IPv6 may be created on an application-to-application basis.

In yet other words, the application 33 itself may be integrated with the relay communication module 35 of the present embodiment to operate as if they were one device with its independent unique IP address.

In the present embodiment, this application 33 is a file server program for performing file operations and the application 33 provides the could server 15 with HTTP and FTP interfaces for providing files such as photographs 45, music and videos 46 stored in the visible area 42.

According to such a structure, the cloud server 15 may utilize a virtual IP address assigned to the application 33 (the relay communication module 35) to connect to the application 33 (the file server program) in a pushing manner to thereby enable operations on the files 45 and 46 stored in the memory card device 21 via an interface provided by this application.

Note that this memory card device 21 comprises a power source management section 39, as shown in FIG. 3. This power source management section 39 actively manages power consumption of the Wi-Fi module 32 according to the operations of the application 33 to thereby enable operations with low power consumption.

(Cloud Server Structure)

Next, the structure of the cloud server 15 will be discussed below.

In the present embodiment, this cloud server 15 is a server dedicated to image processing and is for receiving image files from the digital camera 13 as needed and perform high-quality image processing which is not possible with the digital camera 13.

Figure 6:
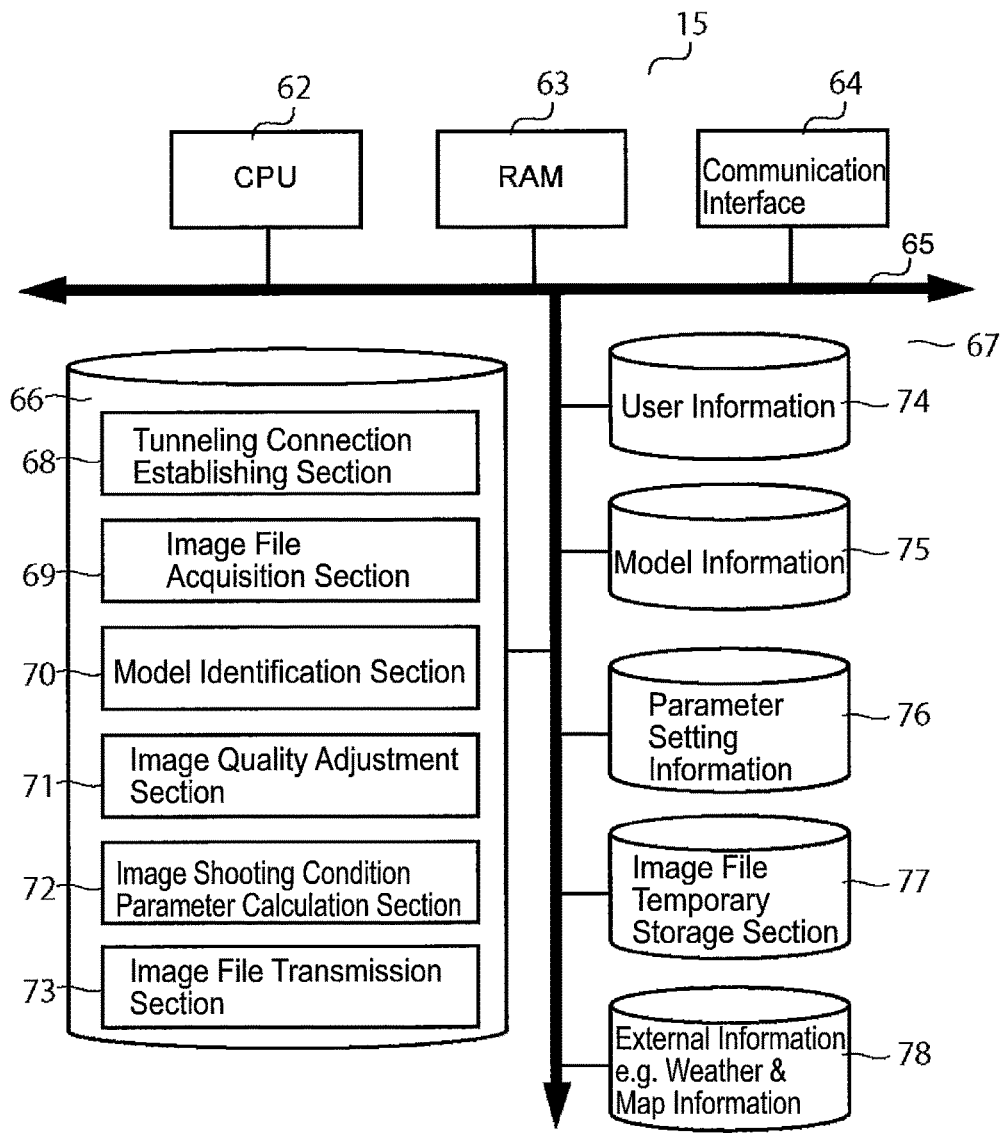
FIG. 6 is a schematic structural view showing the cloud server of the one embodiment of the present invention.

As shown in FIG. 6, this server 15 is a computer system in which a CPU 62, a RAM 63, and a communication interface 64 are connected to a bus 65; wherein a program storage section 66 and a data storage section 67 are also connected to the bus 65.

The program storage section 66 stores basic programs such as an OS (not shown) and the like as well as the following program modules as components related to functions of the present invention.

Namely, a tunneling connection establishing section 68 for establishing a tunneling connection via the Internet with the communication interface 29 (the relay communication module 35) of the memory card 21 inserted into the digital camera 13;

an image file acquisition section 69 for obtaining an image file and the like from the memory card 21 of the digital camera 13 via the application program 33;

a model identification section 70 for reading settings described in meta-information of the image file and determining the model of the digital camera 13;

an image quality adjustment section 71 for adjusting an image quality of the image file based on a predetermined algorithm provided by model;

an image shooting condition parameter calculation section 72 for calculating, based on the determined model, optimal image shooting condition parameters for the model to take the image, and for describing the optimal parameters in the meta-information of the post-adjustment image file; and an image file transmission section 73 for sending the post-adjustment image file to the image shooting apparatus.

Next, stored in the data storage section 67 are:

user information 74 for performing user authentication when the tunneling connection is established;

model information 75 for storing information on models (model name, manufacturer name) recognizable on this cloud server;

parameter setting information 76 provided for the respective models and for storing a method such as an algorithm of determining post-adjustment image shooting condition parameters (parameter types and values);

temporary storage image files 77 such as image files, the post-adjustment image files and the like received from the digital camera (the application program); and weather and map information for storing other external information 78 such as weather information for each geographical area used for the image adjustment.

Each component of the cloud server 15 is adapted to function as each component as set forth in the claims of the present invention by being read and deployed onto the RAM 63 by the CPU 62.

Figure 7:
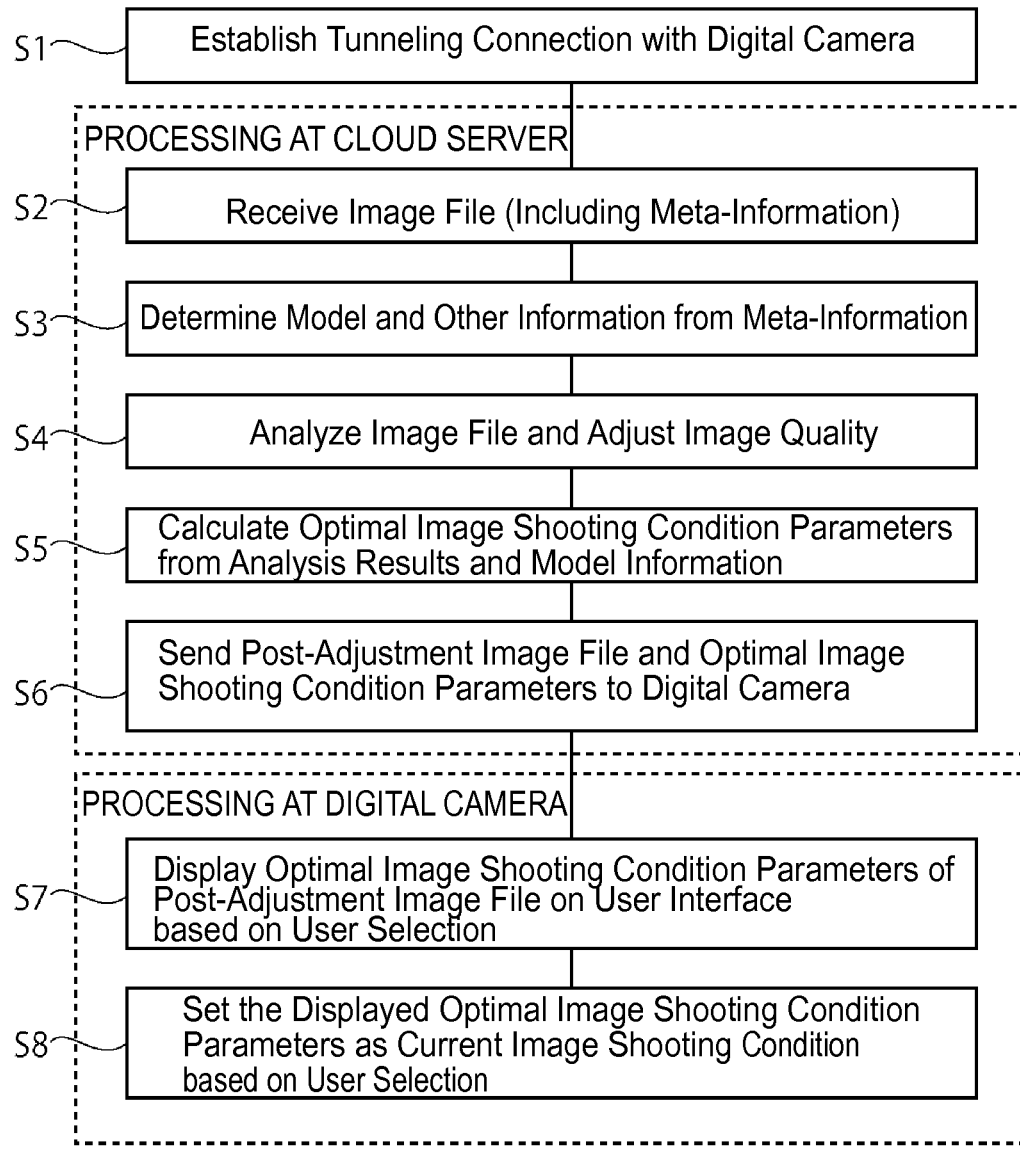
FIG. 7 is a flow chart showing processing of the one embodiment of the present invention.

Operations of the respective components will be described below with respect to a flow chart of FIG. 7.

As discussed above, the cloud server 15 is characterized in that it uses its high-performance image processing capabilities to conduct high-performance image analysis and processing which are not possible with each digital camera 13 (and cell phone equipped with a camera function), and it is configured to obtain settable and optimal image shooting condition parameters by model at the time of the image analysis and processing.

First in Step S1, a tunneling connection between the digital camera 13 and the cloud server 15 is established as previously discussed. Thus, the cloud server 15 may access by pushing, the application program 33 in the memory card 21 inserted in the digital camera 13 and retrieve image data stored in the storage area 27 of the memory card 21. In the present embodiment, when the digital camera 13 takes a picture and additionally stores a new image in the memory card 21, the application program 33 flags this image as a candidate file to be analyzed and image-quality-adjusted by the cloud server 15, and prepares this image for transmission to the cloud server 15.

Note that when the tunneling connection is established between the digital camera 13 and the cloud server 15, the tunneling connection establishing section 68 authenticates the connection based on the user information 74 so that only the pre-registered users or digital cameras/memory cards are allowed to connect to the cloud server 15.

Next in Step S2, the image file receiving section 69 of the cloud server 15 receives the image file from the application program 33. This image file is stored in the data storage section 67 as a temporary storage image file 77.

In Step S3, the model identification section 70 determines the model information included as meta-information in the image file by referring to the model information 75 in the cloud server 15.

In Step S4, the image quality adjustment section 71 analyzes and adjusts the image quality of the image file. Specifically, the server uses its own algorithm to modify the image's brightness, hue, white balance and the like. At this point, an optimal method of adjusting the image quality is selected based on the determined model in this embodiment. Also, information included in the meta-information, for example, information on an image shooting location is referred to, and the image quality is adjusted based on the weather information at that location. An image processing engine used by the image quality adjustment section 71 may be an existing one, and preferably a high-performance engine requiring higher computing power.

In Step S5, the image shooting condition parameter calculation section 72 calculates optimal parameters from the analysis results by the image quality adjustment section 71 and the model information. At this time, this parameter calculation section 72 considers different setting conditions for respective models by referring to the model-by-model parameter setting information 76 (items and values). As a result, the parameter calculation section 72 calculates image shooting condition parameters which are settable with the model of the digital camera 13 being used.

Specifically, with a histogram of a photograph, an exposure compensation, a shutter speed, an aperture and an ISO sensitivity recommendable for the model may be calculated. Also, a lens correction and blurring status associated with the motion of a camera may be detected to allow determination of whether any corrections/compensations should be set, wherein any necessary corrections/compensations will be set as parameters. In this embodiment, any further appropriate parameters are set by using image recognition and/or location information. For example, when a child's movement is detected by the image recognition, setup parameters for a sports mode (with a short shutter speed) will be determined. Note that the sports mode may not function properly on a cloudy day or in a gym, so setup parameters for, for example, reducing the shutter speed may be added if an image shooting situation can be analyzed and identified based on the weather or location information.

In Step S6, the image file transmission section 73 sends the post-adjustment image file and the optimal image shooting condition parameters to the application program 33 provided in the memory card 21 of the digital camera 13. In the present embodiment, the image shooting condition parameters are written as meta-information and sent in the post-adjustment image file, but the image shooting condition parameters may also be sent independently.

The transmitted post-adjustment file and data are stored by the application program 33 in the visible area 42 which can be recognized by the digital camera.

In Step S7, the optimal image shooting condition display/setup section 30 detects the receipt of the post-adjustment file and data (e.g., by detection with flagging or the like) and displays the receipt on the user interface 24. The above steps S2-S7—namely from a user taking an image of an object using the digital camera 13, which in turn stores the image in the memory card 21, to modifying the image in the cloud server 15 and writing the modified image back to the memory card—are preferably performed in a very short period of time; for example, an indication that the image adjustment is completed in the cloud server 15 is preferably notified to the user within a few seconds after the image shooting by the optimal image shooting condition display/setup section 30 via the user interface 24. Thus, the user can confirm the post-adjustment image as well as learn about the optimal image shooting condition parameters.

Also in Step S8, the optimal image shooting condition display/setup section 30 receives a user selection and sets the optimal image shooting condition parameters displayed on the interface 24 as a current image shooting condition through the image shooting condition setup section 25. Thus, the optimal image shooting condition analyzed by the cloud server 15 may be set to the digital camera 13. According to such a structure, a trial image shooting may be performed before an actual image shooting, and the digital camera 13 may be configured with the optimal image shooting condition parameters determined by the cloud server 15.

According to such a structure, an image file and its meta-information obtained with an image shooting apparatus such as a digital still camera, a digital video camera or the like may be sent to the cloud server on the Internet to thereby calculate the image's optimal image shooting condition parameters on the cloud server. Then, based on the optimal image shooting condition parameters obtained as above, so called the "cloud server" may remotely and "dynamically" set the image shooting condition for the image shooting apparatus to thereby enable the user to easily take high-quality images even when the user has limited knowledge and technique and when the apparatus itself has limited performance and degree of setting freedom.

Therefore, the optimal image shooting condition parameters do not need to be the same as the parameters which are manually configurable by the user, and preferably the optimal image shooting condition parameters are rather more detailed parameters.

While one embodiment of the present invention has bee described above, the present invention is not limited by the above one embodiment, and various changes and modifications may be made without departing from the scope and spirit of the invention.

For example, although the application program 33 was a server program, the present invention is not limited so, and the application program 33 may be any program which is capable of enabling bi-directional communication with the cloud server.

Also, the memory card was a removable SD card compatible with the digital camera 13, but the memory card may be any fixed storage means such as a hard disk. Further, the OS 34, the relay communication module 35, the application program 33 and the Wi-Fi module 32 may be installed in a fixed memory (e.g., a hard disk) of the digital camera 13 instead in the memory card 21.

In addition, the image shooting apparatus of the present invention is not limited to a digital camera, and the object of the image adjustment is not limited to an image file. For example, the image shooting apparatus may be a video camera, wherein the image quality of its movie such as a video footage may be adjusted and the image shooting condition parameters may be calculated on the cloud server.

Also, the tunnel broker was adapted to select the cloud server 15 in the above one embodiment, but this selection may be pre-configured in each communication relay module.

What is claimed is:

1. An image shooting system having an image shooting apparatus and a server which connects to the image shooting apparatus through the Internet,
   wherein the image shooting apparatus comprises:
   a first processor configured to record a model of the apparatus and image shooting condition parameters including an exposure, a shutter speed and a white balance, as meta-information in a file of an image taken; and
   a first communication interface configured to connect the image shooting apparatus to the server, send the image file to the server, receive from the server optimal image shooting condition parameters for optimizing an image quality of the image file, and store the optimal image shooting condition parameters in the image shooting apparatus,
   wherein the first processor is further configured to retrieve the optimal image shooting condition parameters received from the server and to set them as image shooting conditions for the image shooting apparatus according to a selection by a user, and
   wherein the server comprises:
   a second communication interface configured to communicate with the first communication interface; and
   a second processor configured to:
   obtain the image file from the image shooting apparatus via the second communication interface;
   read the meta-information of the image file and to determine the model of the image shooting apparatus;
   analyze an image quality of the image file based on a predetermined algorithm, and calculate, based on a result of the image quality analysis and the determined model, optimal image shooting condition parameters for the model for taking the image; and
   send, via the second communication interface, the optimal image shooting condition parameters to the image shooting apparatus.

2. The system of claim 1, wherein:
   the server is configured to store types and values of settable image shooting condition parameters for each model, and
   the second processor is further configured, based on the stored types and values, to calculate the optimal image shooting condition parameters for the model for taking the image, for which image quality has been analyzed.

3. The system of claim 1, wherein:
   the meta-information, described by the image shooting apparatus as the image shooting condition parameters, includes location information of the image shooting apparatus, and
   the second processor is further configured to calculate the optimal image shooting condition parameters for the model for taking the image based on the location information.

4. The system of claim 1, wherein:
   the meta-information, described by the image shooting apparatus as the image shooting condition parameters, includes environmental information including air temperature detected by a sensor of the image shooting apparatus, and
   the second processor is further configured to calculate the optimal image shooting condition parameters for the model for taking the image based on the environmental information.

5. The system of claim 1, wherein:
   the first communication interface is an SD card with an on-board communication function.

6. The system of claim 1, wherein the second processor is further configured to:
   adjust the image quality of the image file obtained from the image shooting apparatus, and
   send the image file to the image shooting apparatus after the image adjustment.

7. The system of claim 1, wherein:
   the image shooting apparatus is a digital still camera.

8. The system of claim 1, wherein:
   the image shooting apparatus is a digital video camera.

* * * * *